Dec. 16, 1947.  E. F. FLINT  2,432,874
EVANESCENT RECORDING DEVICE PERMITTING MEDIAN DETERMINATION
Filed July 31, 1942  3 Sheets-Sheet 1
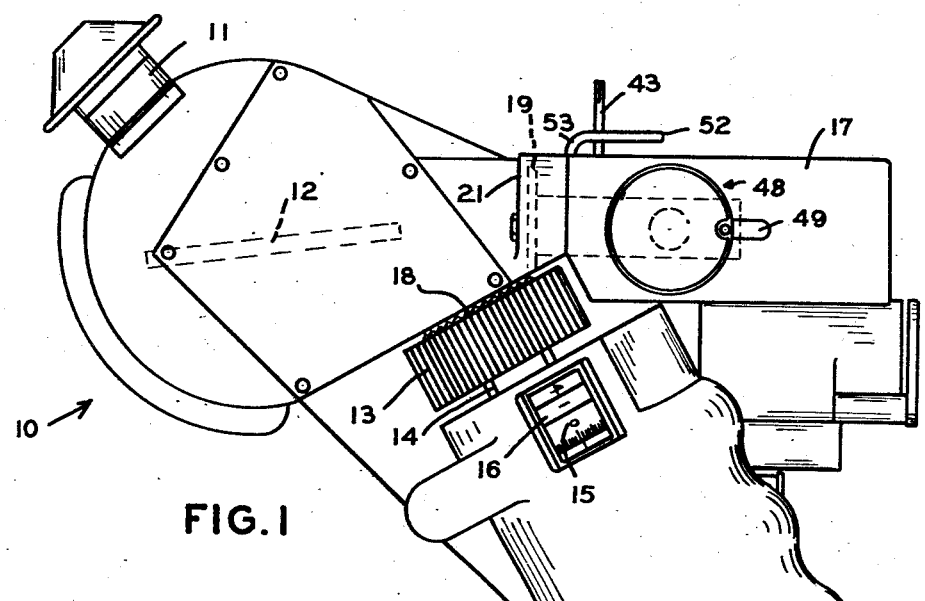
FIG.1
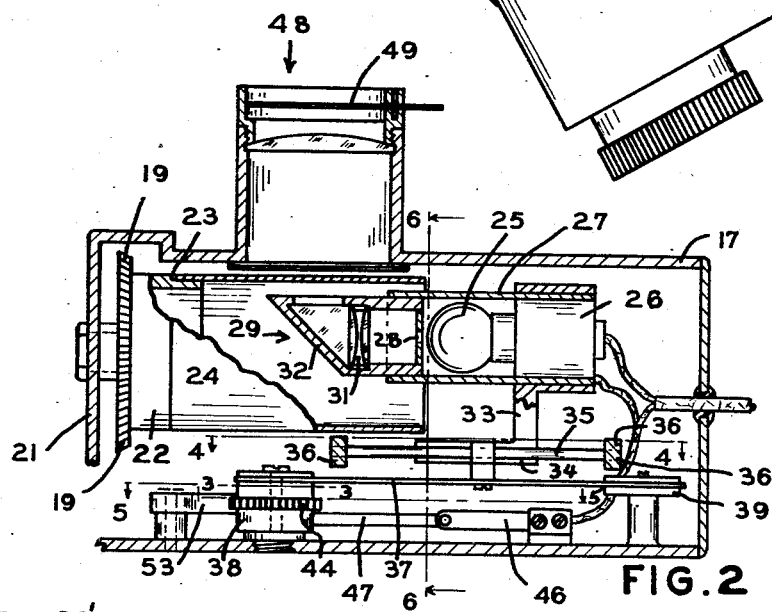
FIG.2
FIG.3
EDWARD F. FLINT
INVENTOR
BY
ATTORNEYS Dec. 16, 1947.  E. F. FLINT  2,432,874
EVANESCENT RECORDING DEVICE PERMITTING MEDIAN DETERMINATION
Filed July 31, 1942  3 Sheets-Sheet 2

EDWARD F. FLINT
INVENTOR
BY
ATTORNEYS

Dec. 16, 1947.   E. F. FLINT   2,432,874
EVANESCENT RECORDING DEVICE PERMITTING MEDIAN DETERMINATION
Filed July 31, 1942   3 Sheets-Sheet 3

EDWARD F. FLINT
INVENTOR
BY
ATTORNEYS

Patented Dec. 16, 1947

2,432,874

UNITED STATES PATENT OFFICE 2,432,874

EVANESCENT RECORDING DEVICE PERMITTING MEDIAN DETERMINATION

Edward F. Flint, Rochester, N. Y., assignor to Bausch & Lomb Optical Company, Rochester, N. Y., a corporation of New York Application July 31, 1942, Serial No. 453,094

7 Claims. (Cl. 234—1)

My invention relates to recording devices and more particularly to a recording device for indicating a series of operations of a mechanism, or, a sequence of events.

The device of the present invention, although not limited to any specific use, is particularly adapted for use with measuring instruments to record a series of quantitative measurements of an instrument and means are provided to permit the determination of the median value if desired, of the recorded series of measurements.

Such devices have been heretofore proposed but have not been satisfactory for in most instances either complicated mechanisms have been used for recording the measurements of the instrument or the measurements were indicated on a permanent record which had to be removed from the device and a new record inserted for each use of the instrument. Furthermore, in devices using a permanent record, care had to be taken to insure that a supply of records was always on hand for the device could not be used without a record.

No complicated mechanisms difficult to keep in proper working order are used in the forms of the device herein disclosed, and, in the preferred embodiment of the present invention, to eliminate the necessity of substituting a new record for each use of the device the record made of the measurements is evanescent and, as it is self-limiting in duration, is only temporarily visible, and after a predetermined time will automatically efface itself and disappear.

The evanescent record may be formed in any manner desired, for it may comprise any record means having a stylus or other marking means for evanescently recording the operations or measurements, but in the now-preferred form of the invention, this means comprises a luminescent material and an exciting means for activating restricted areas of said material. The luminescent material is connected with the operating member of the instrument so that it moves in accordance therewith. The exciting means which may comprise any means for activating the luminescent material, in one form of the present invention, is energized and seriately moved across the record as each measurement is made. As the luminescent material is moved in accordance with movement of the operating means of the instrument and the exciting means is moved in a direction normal to the movement of the record, the relative displacement of the activated or phosphorescent areas indicates the relative magnitude of the measurements.

In another form of the invention herein disclosed, the activating means is so connected to the operating member that it is driven across the luminescent material or record in one direction, notwithstanding the direction of movement of the operating member and the phosphorescent pattern as in the other form of the invention indicates the relative magnitude of the series of measurements.

To permit the median value of the measurements being taken to be determined where desired, a fiducial line is formed by an elongated opaque member superimposed on the luminescent material. As the activated luminescent material will be somewhat luminous after a series of measurements have been indicated, the member will be silhouetted against this luminous background and therefore visible for a time sufficient to permit the medial value to be determined.

In the use of the device of the present invention, the operating means of the instrument is moved to effect the measurement desired, the luminescent material moving in accordance therewith, and in the one embodiment of the invention as each measurement is completed, the observer through a suitable means will move the exciting means a step along the luminescent material. The exciting means in this form of the invention is energized at each movement so that after a series of measurements have been completed, the record will show a series of phosphorescent areas.

In the other form of the invention, the exciting means is continually energized during the time the measurements are being taken and is moved across the record through suitable driving means controlled by the operating means of the instrument. The record made in this form of the invention comprises a phosphorescent line and in either embodiment the observer may by hand adjust the luminescent material so that he may determine the median of the measurements indicated and he may, by reading directly from a scale, determine the quantitative value of the median.

After a series of measurements have been taken and the median value of the measurements determined, the instrument will again be ready for use after a very short period of time for the luminescent material will return to normal after a comparatively short rest.

Fig. 1 is a side elevational view of an instrument showing the device of the present invention mounted thereon.

Fig. 2 is a horizontal sectional view of the device of Fig. 1.

Figure 4:
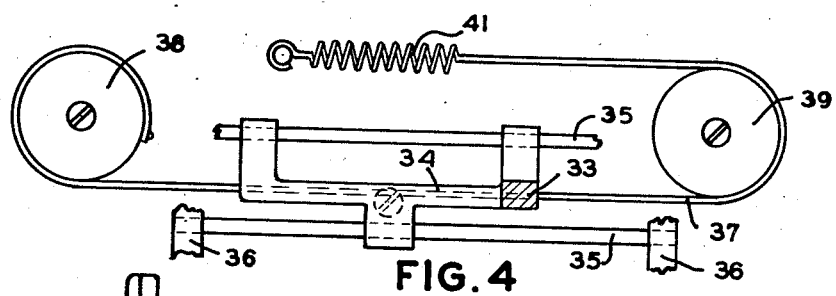
Figure 5:
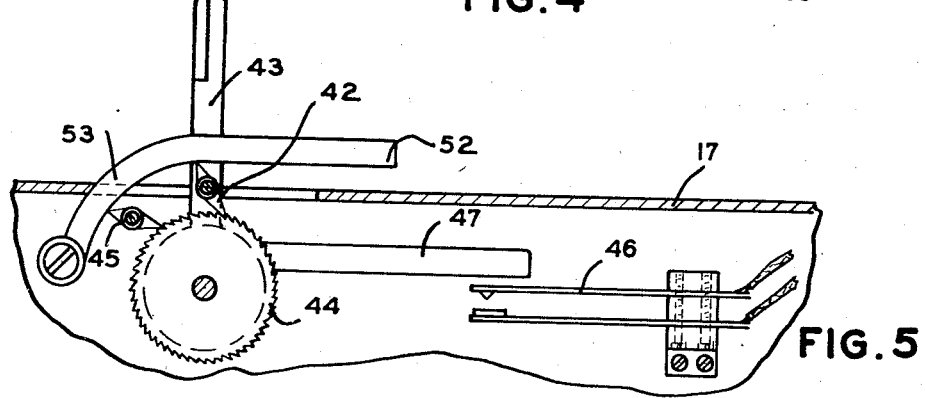
Figure 6:
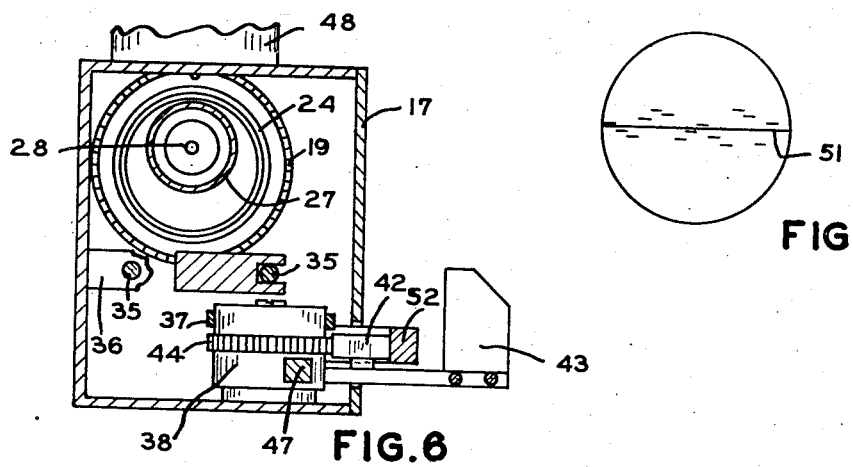
Figure 7:
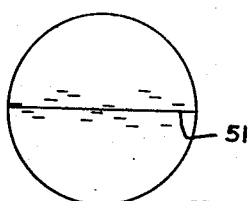

Fig. 3 is a section taken on line 3—3 of Fig. 2.
Fig. 4 is a section taken on line 4—4 of Fig. 2.
Fig. 5 is a section taken on line 5—5 of Fig. 2.
Fig. 6 is a section taken on line 6—6 of Fig. 2.
Fig. 7 is a showing of the record visible to an observer as viewed through the eyepiece of the device of the present device.

Figure 8:
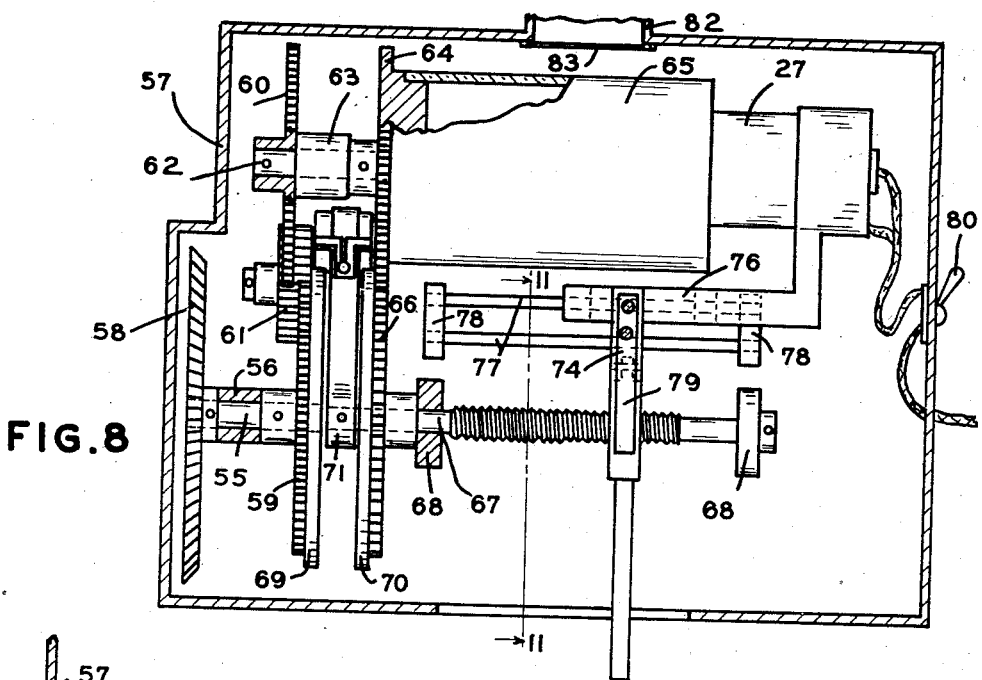

Fig. 8 is a view similar to Fig. 2 but showing a modified form of the device of the present invention.

Figure 9:
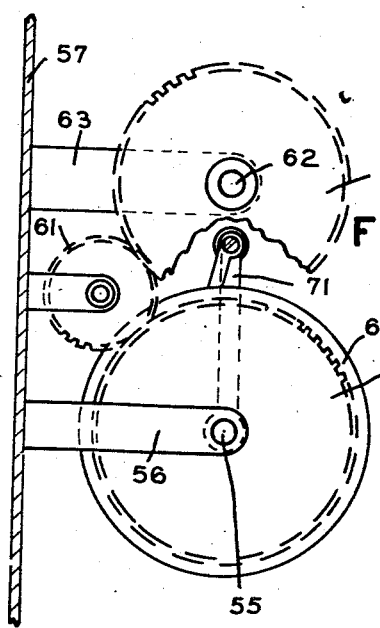

Fig. 9 is an end elevational view of the modified form of the device with the wall of the housing removed.

Figure 10:
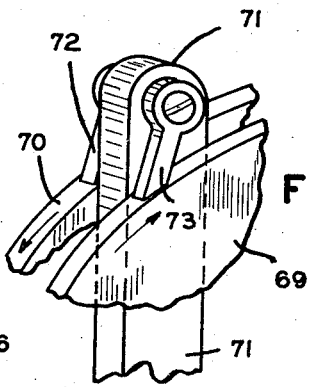

Fig. 10 is a fragmentary perspective view of the driving discs of the modified form of the device as shown in Fig. 8.

Figure 11:
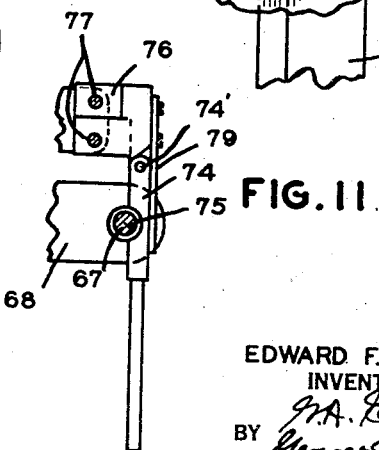

Fig. 11 is a section taken along line 11—11 of Fig. 8.

Figure 12:
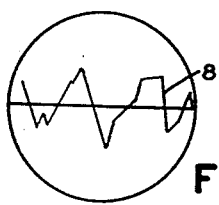

Fig. 12 is a view similar to Fig. 7 but showing the record of the modified form of the invention.

The device of the present invention in the broadest aspects thereof comprises means for recording in any manner preferred, a series of operations of a device and particularly quantitative measurements of various instruments for means are provided which permit the determination of the median value of the measurements so recorded. Although the device may be used as a separate accessory to any instrument desired, it has been shown here for the purpose of illustrating the invention as a part of an octant.

Referring to the form of the invention illustrated in Figures 1 to 7 of the drawing, numeral 10 designates an octant of conventional design and includes the eyepiece 11 by means of which light from a celestial body is directed to the eye after passing through an index reflector 12 which is angularly adjustable with respect to the horizontal as determined by a bubble, gyrostat or the like. A knob 13, fixed to a shaft 14, is used to operate a suitable gear train, not shown, for adjusting the position of the index reflector 12.

An indicating device 15 actuated by manipulation of the knob 13 is visible through a window 16 in the body of the octant 10 and indicates the angular position of the reflector 12.

The device of the present invention is carried within a housing 17, secured to and forming a part of the casing for the octant 10 and is preferably operated through the knob 13. To this end, the knob 13 carries a gear 18, meshing with a gear 19, journaled in the wall 21 of the housing 17. The gear 19 carries a hub 22 having a shoulder 23, formed thereon by reducing the one end thereof. A relatively large tube 24, of some suitable transparent material such as "Lucite," is slipped onto the reduced end of the hub 22, and secured thereto with the one end thereof engaging the shoulder 23. As the tube 24 is fixed to the hub 22, the same will revolve about its longitudinal axis as the knob 13 is adjusted.

The tube 24 is used in the present invention to form the record and to this end the interior surface of the same is coated with some material capable of producing an evanescent record self-limiting in duration. A large number of such materials are available for use, but in the preferred embodiment of the invention, a photoluminescent paint has been used, for it can be excited by light and as the exciting means is out of contact therewith, the tube is subject to no frictional wear as it would be if an electroluminescent material were used and its life therefore is determined only by the life of the photoluminescent material used.

In the form of the invention shown in Figures 1, through 7, the exciting means is mounted within the tube 24, for movement relative to the same and comprises an incandescent lamp 25, mounted within the usual socket 26. The socket 26 carries a shield 27 surrounding the lamp 25 which is connected through the wires shown to some suitable source of current. The lamp illuminates an aperture 28 formed in a transverse wall of an optical unit 29, comprising a pair of lenses 31 and a prism 32. The lenses 31 form an image of the illuminated aperture which is deflected by the reflecting surface of the prism to the coated surface of the tube 24.

The socket 26 is fixed to an arm 33 of a carriage 34, which is mounted for sliding movement on a pair of rods 35, carried by lugs 36, preferably cast with the wall of the housing. The movement of the carriage 34 is controlled through a cable 37, secured to the carriage intermediate the ends thereof. The one end of the cable is passed around and secured to a drum 38, the opposite end of the cable being passed around a pulley 39 and secured to an end of a coil spring 41. The opposite end of the spring is fixed to the housing 17 so that the spring will normally hold the carriage to the right of the position of the carriage shown in Figure 2.

A pawl 42, pivotally mounted on a similarly mounted lever 43, engages and drives a ratchet 44, fixed to the drum 38. When the lever 43 is rocked, the drum is rotated step by step, the cable winding thereon, and the carriage and the lamp carried thereby are moved longitudinally of tube 24. A second pawl 45, pivotally mounted on the housing 17, is provided as a holding member so that the drum 38 which carries an internally mounted spring 38' to take up slack, will not turn as the pawl 42 is returning to its normal position.

Although the lamp may be energized during the entire time the series of measurements are being made, in this form of the invention the lamp is only energized as it is moved to a new position relative to the tube 24. A switch normally open, referring now to Figure 5, comprising a pair of spaced relatively movable contacts 46, is closed on operation of the lever 43 through a laterally projecting arm 47, the arm 47 closing the contacts 46 as the lever 43 is rocked about the pivot. Thus the lamp will be energized each time the lever 43 is rocked to move the lamp to a new position relative to the tube 24.

In the use of the form of the invention just described, an observer by adjusting the position of the index reflector by manipulation of the knob 13 may measure the inclination of some known celestial body and the inclination will be indicated by the indicator 15. As accurate navigation depends to a very large extent upon the accuracy with which an observer can determine his position relative to some celestial body, a series of measurements or sights are taken and the median value is used as the correct elevation. This practice will minimize, if not altogether eliminate, errors of sighting, reading or the like.

After each sight, by rocking the lever 43, the lamp is moved to a new position along the longitudinal axis of the tube 24 and is energized so that a light ray therefrom is directed to the coated surface of the tube 24, and a small area of the surface is excited and becomes luminous. The luminous areas may be viewed through a suitable eyepiece 48, normally closed by a movable shutter 49, and the record of the measurements taken appears somewhat as shown in Fig. 7. After a series of sights have been made, for example 15, the observer merely determines which area is the median or middle area. As the relative displacement of the luminous areas indicates the relative magnitude of the series of sights or measurements, an observer, by rotating the tube 24, can bring the median area under a fiducial line 51 formed by a wire extending across the eyepiece 48 and from the indicating device 15, determine the value of the area indicative of the median measurement of the angular elevation of the celestial body.

As the tube 24 will be somewhat luminous after a series of sights have been taken, the wire will be silhouetted against this luminous background and therefore clearly visible for a time sufficient to permit the median of the area to be determined.

The luminescent material used to coat the interior of the tube 24, should be such that it will retain its luminescent qualities after it has been activated, but a relatively short time, so that the instrument may be used to take another series of sights or measurements within a short time after a series has been completed.

After a series of sights have been taken and the median of the measurements been determined, the lamp 25 may be returned by releasing the pawls 42 and 45 from engagement with the teeth of the ratchet 44, as the spring 41 will unwind the cable 37 from the drum 38 and draw the lamp carriage back to the starting position. Any means may be employed to release the pawls and in the embodiment of the invention now preferred, referring now to Figure 5, an arm 52, pivotally mounted on the housing 17 and having a curved base 53, engages the free end of the pawls and cams the same out of engagement with the ratchet 44 when the arm 52 is rocked about its pivot.

There is shown in Figures 8 through 11 a modified form of the invention which may, if desired, be used with the octant shown in Figure 1. In this form of the device, the lamp is continually energized and moved along the longitudinal axis of the luminescent tube while the series of measurements are being taken. Although the lamp may be driven longitudinally of the tube by any suitable means such as a clockwork, in the preferred embodiment of this form of the invention, movement of a lamp is effected through manipulation of the adjusting knob 13.

To this end a shaft 55, rotatably secured in a support 56 or the like, forming a part of the housing 57, carries a gear 58, driven by the gear 18, fixed to the knob 13 of the instrument. The shaft 55 carries a second gear 59 which drives a similar gear 60 through a reversing idler 61. The gear 60 is pinned to a shaft 62, journaled in a bearing lug 63. The shaft 62 carries a gear 64 to which is mounted a tube 65, identical with tube 24 of the first described form of the present invention.

Thus the movement of the knob 13 through the gear train just described, will cause the tube 65 to move in accordance therewith.

The gear train is used to bring about movement of a lamp relative to the tube for the gear 64 meshes with and drives a gear 66, rotatably carried by a shaft 67, journaled in lugs 68, preferably cast with the housing 57. The gear 66 and the gear 59 carry on their adjacent faces friction discs 69 and 70, respectively. An arm 71 pinned to the shaft 67, carries pawls 72 and 73, engaging discs 70 and 69, respectively. The pawls are spring-pressed into engagement with the edge faces of the discs and the disc-engaging faces of the pawls are shaped to snugly engage the curved edge faces of the discs. The pawls project in the same direction and are obliquely carried by opposite faces of the arm 71 with the free end faces thereof contacting the discs 69 and 70. Each pawl is of such a length relative to the distance between the fixed end thereof and the edge face of its disc that one or the other is drivingly engaged with its respective disc upon actuation in either direction of the knob 13. This is best seen in Figure 10 where disc 69 is moving in the direction of the arrow and disc 70 as indicated is moving in the opposite direction. In this movement of the two discs, pawl 73 will frictionally engage and move with the disc 69 while pawl 72 will slide relative to the disc 70. As pawl 73 is frictionally held against movement relative to disc 69, the arm 71 will be carried around in the direction of rotation of the disc 69. As the arm 71 is pinned to the shaft 67, the shaft will rotate in the direction of movement of the arm 71. If the direction of rotation of the discs is now to be reversed, it will be seen, referring again to Figure 10, that the disc 70 and pawl 72 will move the arm again in the identical direction as the arm was moved when the disc 70 was rotating in the opposite direction. Thus, no matter in what direction the discs are moving, the arm 71 will always swing to the right as viewed in Figure 10 and consequently the shaft 67 will be driven in the same direction, regardless of the direction of movement of the adjusting knob 13. Accordingly, this movement of the shaft 67 is transmitted to the lamp assembly by a suitable connection which may comprise an arm 74 having a threaded half-round notch 75 formed in the one face thereof and engaging a correspondingly threaded portion of the shaft 67. The arm 74 is pivotally connected as at 74' to a carriage 76, slidably mounted on rods 77 carried by bosses 78 formed on the wall of the housing 57. A leaf spring 79 having one end fixed to the carriage 76, holds the arm 74 in engagement with the shaft 67. The lamp socket which carries an optical unit, identical with the optical unit illustrated in the first form of the invention described, is secured to the carriage 76 and will move longitudinally of the tube 65 as the carriage is moved longitudinally of the supporting rods 77. The lamp socket is connected to some suitable source of current through a switch 80 carried by the wall of the housing 57 and in the use of this form of the device of the present invention, the switch 80 is closed and the lamp energized when the series of readings are commenced.

As the lamp is continually energized while the measurements are being taken, the luminescent pattern indicating the relative magnitude of the measurement will not, as in the first form of the invention described consist of a plurality of phosphorescent areas, but will comprise a more or less irregular phosphorescent line such as shown at 81 in Figure 12. This line may be viewed by the observer through an eyepiece such as the eyepiece 48 of the first described form of the present invention and here fragmentarily shown at 82. A fiducial line formed by the wire 83 allows an observer to adjust the tube and the median value of the angular elevation of the celestial body may thus be read from an indicator such as that shown at 15 in Figure 1.

In the form of the invention just described, as the mechanism for moving the activating lamp in accordance with movement of the knob 13 lends itself to any recording device, the luminescent tube and lamp may be substituted for a record formed of paper or similar material and a marking member such as an inking stylus.

While certain preferred embodiments of the invention have been illustrated and described herein, it is to be understood that the invention is not limited thereby but is susceptible of changes in form and detail within the scope of the appended claims.

I claim:

1. In a measuring instrument having an operating member movably mounted for making measurements, a recording device comprising a cylinder formed of light transmitting material, luminescent material deposited on the surface of the cylinder, said cylinder being movably mounted to turn about its axis, means operatively associated with the cylinder and the member for transmitting movement of the member to the cylinder for turning the latter in accordance with the measurements made, a track mounted adjacent to the cylinder and substantially parallel to the axis thereof, a carriage slidably mounted on said track, a light source for activating the luminescent material, said source being positioned within the cylinder and carried by the carriage, and driving means operatively associated with the carriage and said member for moving the light source longitudinally of the cylinder as successive measurements are made whereby the measurements are evanescently recorded on the luminescent material.

2. A recording device for use with a measuring instrument having an operating member movable in accordance with the measurements made, said device comprising a cylindrical area of luminescent material, said area of material being mounted to turn about its axis, means operatively connecting said member to the cylindrical area whereby movement of the member will cause the area of material to turn in accordance with the measurements made, a light source mounted adjacent the concave side of the area for activating said material, and means for moving said light source along a path which is substantially parallel to the axis of the cylindrical area whereby evanescent records of the measurements are made on said luminescent material.

3. A recording device for use with a measuring instrument having an operating member movable for making successive measurements, said device comprising a cylinder formed at least in part of light transmitting material, luminescent material on the light transmitting part of the cylinder, said cylinder being mounted to turn about its axis, means operatively connecting the cylinder to the member whereby movement of the latter will be imparted to the cylinder in accordance with the measurements made, a light source mounted within the cylinder for activating the luminescent material, said source being mounted for movement along a path which is parallel to the axis of the cylinder, and means for moving said source between successive measurements whereby evanescent records of the measurements are made on the luminescent material.

4. A recording device for use with a measuring instrument having an operating member movable in accordance with each measurement of the instrument, said device comprising a cylindrical member having a light transmitting portion, luminescent material on said portion, said cylindrical member being mounted to turn about its axis, means operatively connecting the cylindrical member with the operating member whereby movement of the latter will be imparted to the cylindrical member in accordance with the measurements made, a light source positioned within the cylindrical member for activating the luminescent material, track means for movably mounting said source to move parallel to the axis of the cylindrical member, means for moving the source in successive steps along the track means and means for energizing the light source before each step of its movement whereby spaced evanescent records of the measurements are made on the luminescent material.

5. In a measuring instrument having an operating member movably mounted for making measurements, a recording device comprising a cylinder formed of light transmitting material, luminescent material deposited on the surface of the cylinder, said cylinder being movably mounted to turn about its axis, means operatively associated with the cylinder and the member for transmitting movement of the member to the cylinder for turning the latter, a track mounted adjacent to the cylinder and substantially parallel to the axis thereof, a carriage slidably mounted on said track, an electric light source for activating said material, said source being carried by the carriage and positioned within the cylinder, means for moving the source longitudinally of the cylinder in successive steps as successive measurements are made, said last named means including a lever coacting with a pawl and ratchet mechanism operatively connected to the carriage, and means cooperating with said lever for energizing the light source upon each actuation of said lever whereby spaced evanescent records of the measurements are made on the luminescent material.

6. A recording device for use with a measuring instrument having an operating member movable in accordance with each measurement of the instrument, said device comprising a cylindrical member having a light transmitting portion, luminescent material on said portion, said cylindrical member being mounted to turn about its axis, means operatively connecting the cylindrical member with the operating member whereby movement of the latter will be imparted to the cylindrical member, a light source positioned within the cylindrical member for activating the luminescent material, track means for movably mounting said source to move parallel to the axis of the cylindrical member, other means operatively connected to the operating member for moving said source in only one direction along the track means whereby a continuous evanescent record of the measurements is made on the luminescent material.

7. A recording apparatus for use with a measuring instrument having an operating member movable in opposite directions for making measurements, said apparatus comprising a cylindrical record receiving element mounted to turn about its axis, means operatively connecting said element to said operating member whereby movement of the latter will be transmitted to turn the element on its axis, a device for making a record on said element, track means for movably mounting said device adjacent to said element for rectilinear movement in a path substantially parallel to the axis of the cylinder, other means operatively connecting the operating member to the device for moving the device along the track means, said other means including means for moving said device in only one direction upon movement of the operating member in either direction whereby a continuous record of successive measurements is made on said record receiving element.

EDWARD F. FLINT.

REFERENCES CITED

The following references are of record in the file of this patent:

UNITED STATES PATENTS

| Number | Name | Date |
|---|---|---|
| 813,933 | Abraham | Feb. 27, 1906 |
| 1,078,138 | Frick | Nov. 11, 1913 |
| 1,480,920 | Weeden | Jan. 15, 1924 |
| 1,681,460 | Bruhn | Aug. 21, 1928 |
| 1,700,399 | Bruhn | Jan. 29, 1929 |
| 1,883,907 | Hathaway | Oct. 25, 1932 |
| 2,098,689 | Masson | Nov. 9, 1937 |
| 2,200,741 | Gray | May 14, 1940 |
| 2,210,565 | Asher | Aug. 6, 1940 |
| 2,257,233 | Gallasch | Sept. 30, 1941 |
| 2,278,203 | Le Petit | Mar. 31, 1942 |
| 2,319,898 | Zurian | May 25, 1943 |
| 2,327,826 | Sherwood | Aug. 24, 1943 |
| 2,340,324 | Hobbs | Feb. 1, 1944 |
| 2,349,506 | Lowkrantz et al. | May 23, 1944 |

FOREIGN PATENTS

| Number | Country | Date |
|---|---|---|
| 810,260 | France | Dec. 28, 1936 |